Oct. 27, 1953  O. E. ANDRUS  2,657,298
METHOD AND APPARATUS FOR MANUFACTURING COMPOSITE PLATES
Filed Oct. 29, 1951

INVENTOR.
Orrin E. Andrus.
BY Andrus & Scales
ATTORNEYS.

Patented Oct. 27, 1953

2,657,298

UNITED STATES PATENT OFFICE 2,657,298

METHOD AND APPARATUS FOR MANUFACTURING COMPOSITE PLATES

Orrin E. Andrus, Milwaukee, Wis., assignor to A. O. Smith Corporation, Milwaukee, Wis., a corporation of New York Application October 29, 1951, Serial No. 253,691

15 Claims. (Cl. 219—10)

This invention relates to a method and apparatus for manufacturing composite metal articles, and particularly to the heat and pressure bonding of a corrosion resistant liner sheet to a base plate.

An object of the invention is to provide a bonding method and apparatus adapted to produce a composite plate without thinning the same, and without adversely affecting the metallurgical properties thereof through extensive heating and rolling operations.

A further object is to provide a method of bonding composite plates which eliminates the necessity of employing relatively expensive apparatus such as furnaces, pressure rolls, and presses.

Another object of the invention is to provide a method and apparatus for rapidly and efficiently uniting a liner sheet and a base plate through application of heat and pressure to successive portions of the liner until a continuous bond results.

Another object is to create a uniform continuous pressure contact between the liner sheet and base plate by bending the liner sheet into conformity with irregularities in the base plate surface as distinguished from deforming the base and liner metals until continuous contact results.

Another object is to provide a method and apparatus for uniformly heating selected portions of the liner sheet and base plate in a relatively short period of time.

In general, the method of the invention comprises induction heating two contiguous metal members to a bonding temperature and applying fluid under high pressure to one of the members in a direction to force the same into continuous pressure contact with the other member and thereby effect the bond. More particularly, the pressure is applied by defining a fluid-tight chamber adjacent a portion of a liner sheet, and injecting pressure fluid into the chamber while holding the corresponding base plate portion against movement so that the liner sheet portion is forced into continuous conformity therewith. The apparatus for performing the described method includes a casing, an inducing coil mounted within the casing in a position to be closely adjacent the liner sheet when the casing is placed thereon, and a frame adapted to hold the casing and base plate in position during the pressure operation.

Other objects and advantages of the invention will be set forth more fully in the following description of an embodiment of the invention illustrated in the accompanying drawings.

The invention is illustrated as employed in the bonding of a liner sheet 1 to a base plate or sheet 2 of substantially the same size and shape. The base plate 2 is normally composed of a strong and relatively inexpensive metal such as carbon steel, whereas the liner member may be formed of stainless steel, nickel, silver, or other suitable corrosion resistant facing metal. Because of the relative strength and cost characteristics of the liner and base metals the liner sheet 1 is usually much thiner than the base member 2, with the thickness of the liner sheet being governed by the corrosive properties of the various fluids to be contained within vessels fabricated from the finished composite plates after the same have been formed into the desired shape as by a rolling operation.

Figure 1:
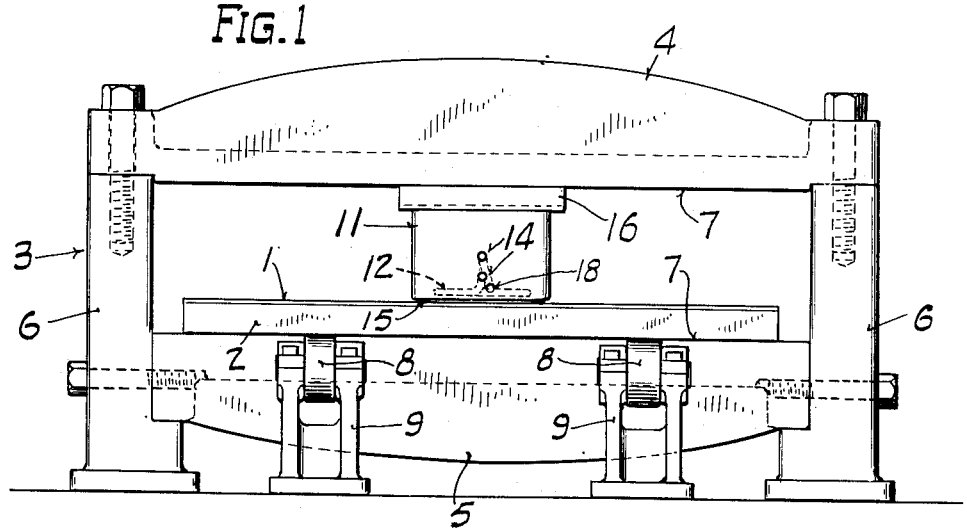
Figure 1 is an end view illustrating a liner sheet and base plate as disposed in the bonding apparatus.
Figure 2:
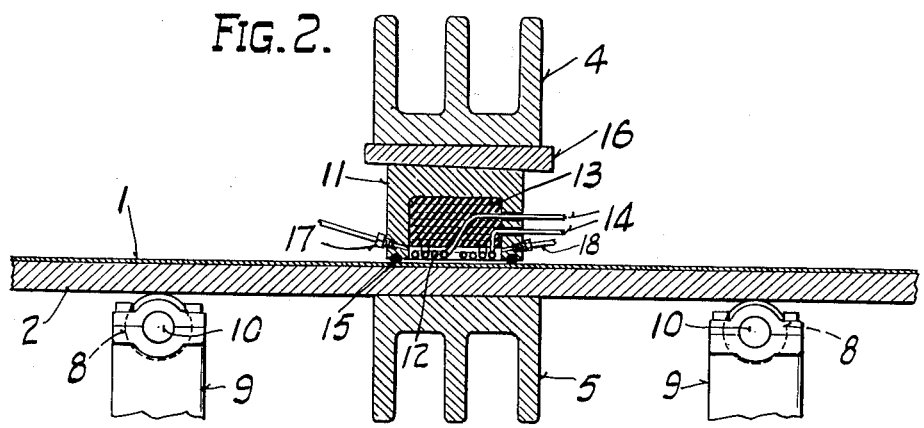
Fig. 2 is a partial longitudinal central section of the apparatus.

Referring to Figs. 1 and 2 of the drawings, the apparatus for performing the method of the invention includes a rigid frame structure 3 having spaced upper and lower horizontal beams 4 and 5 bolted at their ends to a pair of supporting posts 6. The horizontal inner surfaces 7 of the beams are preferably made flat and smooth to permit free-sliding support of the members engaging the same during performance of the method.

As best shown in Fig. 1, a plurality of conveyor rolls 8 are mounted, respectively, at the upper ends of suitable brackets 9 which are arranged in pairs longitudinally of the apparatus. The rolls 8, only two pairs of which are shown, are positioned at approximately the same level as the flat inner surface 7 of the lower beam 5 and serve together with the surface 7 to support the base plate 2 as well as the liner sheet 1 which is disposed flatwise on the upper base plate surface. The rolls 8 are freely revolvable on transverse axes 10, so that various portions of the engaged sheets 1 and 2 may be slid onto the lower beams surface 7 for heat and pressure treatment by the apparatus next to be described. As an alternative to the above construction, the rolls 8 may be mechanically driven to facilitate positioning of the plates 1 and 2. In addition, means may be provided to elevate the rolls prior to positioning movements until the plates are lifted off the lower beam 5, so that the surface 7 thereof becomes inoperative to frictionally resist plate movements.

According to the invention, the heat and pressure apparatus comprises a casing 11 having an inducing coil 12 arranged therein to induce heating currents into the members 1 and 2. The casing 11, which is of sufficient size to cover a substantial area of the liner sheet, is preferably formed of metal and has relatively thick walls adapted to withstand high fluid pressures. The casing walls are designed, for example with laminations or slots, not shown, in such a way that the harmful effects of any currents which may be induced therein are minimized. Preferably, the casing is generally rectangular in shape and is formed with an open bottom for efficient application of fluid pressure to a portion of the liner sheet.

A non-conducting filler member 13 is positioned in the upper and closed end of casing 11 to fill the void in the casing and provide a mounting surface for coil 12 and thereby space the same from metal. The filler member, which is incompressible and impervious to fluid, terminates in a horizontal plane surface near the lower edge of the casing. Various heat resistant materials may be employed in forming the filler 13, for example stacked asbestos sheets sealed with a vitreous substance.

Figure 3:
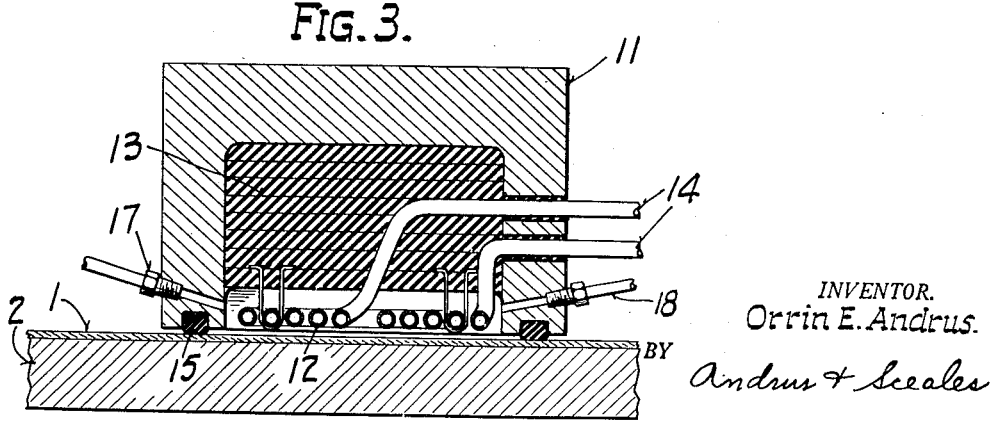
Fig. 3 is an enlarged longitudinal cross-sectional view of the casing and the induction coil mounted therein.

As best shown in Fig. 3, the inducing coil 12 is mounted on the lower surface of filler member 13 and is positioned so as to be closely adjacent the liner sheet 1 when the casing 11 is disposed thereon. The coil is formed of hollow copper tubing wound in spiral shape and terminating at end portions 14 which extend through a wall of casing 11 and are suitably insulated therefrom. In operation, cooling water is piped through the coil and a fluctuating or alternating current is applied thereto by a suitable source, not shown.

In order to provide a fluid tight chamber between the liner sheet 1 and filler member 13 when the casing 11 is pressed down on a portion of the liner, a sealing member 15 is mounted at the lower edge of the casing. The sealing member preferably consists of a silicone rubber O-ring mounted in a rectangular groove in the edge portion of the casing.

As a means for pressing down the casing 11 to define the described pressure fluid chamber, a wedge plate 16 having an inclined lower surface is disposed on the correspondingly inclined upper surface of the casing. The upper surface of the wedge plate is horizontal and engages the smooth inner surface 7 of the upper beam 4, so that the casing may be either pressed against a portion of the liner sheet or released therefrom by merely sliding the wedge longitudinally of the apparatus.

In order to admit pressure fluid into the sealed chamber formed between the lower surface of filler member 13 and the opposed portion of liner sheet 1, a port is provided in the casing wall beneath the filler member and adapted with a fitting 17 for connection with a source of pressure fluid. The fitting 17 or other means are also employed to introduce a cooling substance into the chamber after the bonding operation. As a means for exhausting the pressure and cooling substances from the chamber, a second port and fitting 18 may be provided as shown in Figs. 2 and 3.

In practicing the method of the invention, the liner sheet 1 and base plate 2 are first cleaned and otherwise prepared and then arranged in contiguous flatwise relation. The preparation of the members may include plating one or more interfaces with nickel or iron in order to enhance the bond therebetween. As an alternative to plating, the nickel may be interposed in sheet form.

Where it is desirable to create the bond through high temperature brazing as distinguished from welding, a suitable brazing material is applied to the members prior to the assembly thereof. A preferred compound is marketed under the trade-mark "Nicrobraze," and comprises an alloy of chromium, nickel, boron, iron, silicon and carbon.

Various steps should be taken, either before or after the members 1 and 2 are assembled, to prevent the same from oxidizing and scaling during heating. This is accomplished by sealing the peripheral edges of the members as by fusion welding the same. For best results, the resulting chamber between the base plate and liner sheet is substantially evacuated or filled with a neutral or reducing medium.

The work having been prepared as described, the next step in the method comprises creating the bond through the application of induction heat and fluid pressure to the members 1 and 2. Any suitable induction heating and fluid pressure apparatus may be employed with a main requirement being that a substantial area of the liner, both in length and in width, be treated at the same time.

With the apparatus illustrated in the drawings, the bonding is performed by arranging the assembled members so that the base plate 2 rests on the rolls 8 and on the flat inner surface 7 of the lower beam 5. The casing 11 is next disposed on a selected portion of the liner sheet 1 above beam 5, the inducing coil 12 then being contiguous to the liner sheet as previously mentioned.

In order to define a fluid-tight chamber between the lower surface of filler member 13 and the corresponding liner sheet portion, the wedge plate 16 is inserted between the casing and upper beam 4. A relatively slight downward pressure, created by sliding the wedge longitudinally, is sufficient to deform O-ring 15 and provide a seal capable of withstanding internal fluid pressures up to several thousand pounds per square inch.

The next operation in the method comprises injecting pressure fluid through the fitting 17, and thus into the chamber between the filler member 13 and the liner sheet portion, and applying a fluctuating or alternating current to the inducing coil 12. Preferably, the injection of pressure fluid and the commencement of induction heating occur at approximately the same time so that as the liner metal becomes heated and relatively pliable the fluid pressure within the casing operates to bend the liner portion into continuous contact with the base plate portion. Further heating action is thereby rendered more uniform in that the elimination of air gaps between the liner and base plate portions increases the amount of heat conduction between the interfaces and thus tends to equalize the temperatures thereof.

The application of current to the coil 12 is continued until the corresponding currents induced into the proximate portions of the members 1 and 2 have heated the interfaces thereof to a brazing or welding temperature, depending upon the type of bond that is being effected. The power induced in the work is preferably made relatively high, so that bonding heat is obtained in a short time. The actual value of the bonding temperature is governed by the types of metals being joined, and also by the presence or absence of a brazing material between the members 1 and 2. Where the bond is effected by welding, bonding temperature or welding temperature would be attained when the members 1 and 2 reach a suitable plastic state. For brazing, on the other hand, the plastic range of the base and liner metals need not be reached, it being merely necessary that the brazing material be melted.

The amount of the fluid pressure applied during heating need only be sufficient to bend the liner into continuous conformity with the base plate, and depends upon the temperature and thickness of the liner sheet and upon the metal of which the same is formed. Where the pressure of the fluid within the casing during heating is insufficient to create the desired bond, the pressure of the fluid is next increased to a high final value, for example several thousand pounds per square inch, sufficient to effect bonding. The liner and base plate portions are thus in continuous pressure contact and a strong and permanent bond is made. During pressure application, the upper and lower beams 4 and 5 serve, respectively, to hold the casing 11 and base plate 2 in place.

The relative times at which the pressure fluid and the heating current are applied and discontinued are largely dependent upon the materials being bonded and the type of bond being made. As above indicated, it is highly desirable that at least a substantial amount of pressure be applied prior to the main portion of the heating step and maintained during heating. Also, it is essential that final bonding pressure be present during at least part of the time when the members are at the desired bonding temperature. In some cases it is necessary that final bonding pressure be maintained after cessation of the inducing current and during the first stages of cooling of the members. The latter is particularly important where brazing is employed since the melted brazing material must be allowed to solidify before the pressure is released.

Where certain types of stainless steels and other metals are employed for the liner sheet 1, it is important that the heated liner sheet portion be quenched after cessation of the inducing current. For such metals a coolant is introduced into the fluid chamber to rapidly cool the portion of the work on which the casing is located. In addition to serving as a quench, the cooling operation aids in the prevention of warping of the work and deterioration of the material of which the sealing member 15 is formed. Accordingly, the coolant may be utilized even when quenching is unnecessary. The coolant is preferably introduced into the fluid chamber prior to the release of the fluid pressure in order to maintain warping at a minimum.

The pressure fluid may be any one of a number of liquids, gases, or other fluid substances. Preferably, a gas is employed in order to minimize the problem of recovery of the fluid after use. Examples of preferred gases include steam, air, nitrogen, helium, and argon.

It is a primary requirement that the pressure fluid be stable relative to the liner member 1 at the bonding temperature to which the liner is heated. By this it is meant that the fluid does not react adversely with the liner at bonding temperature, and does not explode or otherwise react when raised to bonding heat. Fluorine is one example of a fluid which is unstable relative to most liner metals, and acetylene is another example. Water, on the other hand, would not be considered unstable as the term is herein employed since the steam to which the water is changed at bonding temperature can easily and harmlessly be employed as the pressure fluid for certain liner materials.

The cooling or quenching medium may comprise water, oil, compressed air, or other suitable substance. In certain instances the same fluid may be employed for pressure and for quenching.

As an illustration of an application of the invention, assume that it is desired to weld a stainless steel liner five thirty-seconds of an inch in thickness to a three-quarter inch carbon steel base plate. In this instance the fluid pressure for final bonding would be in the vicinity of four thousand pounds per square inch, whereas the welding temperature is approximately two thousand to four thousand degrees Fahrenheit. The metals at such temperatures are in the plastic range as desired for welding.

After the bonding of two corresponding portions of the members 1 and 2 in the manner set forth, the fluid pressure is released, the wedge plate 16 is loosened or removed, and the casing and work are relatively moved until an adjacent unbonded portion of the work is beneath the casing. The process is then repeated, after which successive portions of the liner sheet and base plate are treated until a continuous bond is effected.

Instead of treating adjacent portions successively, it may be desired to skip to a cool portion of the work and return to the first portion after the cooling thereof. In order to make the bond continuous, it is necessary that there be overlapping of the edges of the treated areas.

The use of induction heating and subsequent quenching, as distinguished from furnace heatting, results in a composite plate the metallurgical properties of which are substantially unimpaired. This is especially important in the case of certain types of stainless steels which are adversely affected by prolonged heating and rollng operations.

The invention is particularly advantageous in that the liner member 1 is bent into continuous conformity with bulges and depressions in the base plate 2 as distinguished from being deformed until continuous contact is achieved. The term "bent" as employed herein is intended to mean that the liner member remains substantially uniform in thickness and is curved by the fluid pressure against the base plate interface. "Deformed," on the other hand, is meant to denote the flowing of liner metal, such as occurs when plates are rolled, until continuous contact results from variations in the thickness of the liner metal and also of the base metal. Where the liner is deformed instead of bent the variations in liner member thickness render the composite plate subject to corrosive attack at the relatively thin spots, so that it is necessary to have a thick liner in order to insure that the thin spots will offer adequate protection.

By the use of the word "flatwise" in the specification and claims it is not intended to mean that the members 1 and 2 necessarily have plane surfaces, since members having correspondingly curved surfaces may also be bonded by the method of the invention.

Various embodiments of the invention may be employed within the scope of the following claims.

I claim:

1. A method of bonding two members disposed in contiguous flatwise relation, which comprises induction heating opposed portions of said members to a bonding temperature and applying high fluid pressure to the outer surface of at least one of said portions, said pressure being present at least during part of the time that said portions are at bonding temperature and being sufficient to effect bonding thereof, and said portion being of substantial size both in length and in width and being bent by said fluid pressure into conformity with the opposed portions as distinguished from being deformed into conformity therewith.

2. A method of bonding a metal base plate and a metal liner sheet disposed in contiguous flatwise relation therewith, which comprises induction heating substantial opposed portions of said base plate and liner sheet to a bonding temperature and applying to the outer surface of said liner sheet portion a fluid under high bonding pressure, said fluid being applied at least during part of the time that said portions are at said bonding temperature in order to effect bonding thereof and being stable relative to the metal of said liner sheet at said bonding temperature in order to prevent undesirable reactions therewith.

3. A method of manufacturing a composite plate, which comprises placing a base plate and liner sheet in contiguous flatwise relation, induction heating substantial opposed portions of said base plate and liner sheet to a bonding temperature and applying high fluid pressure to the outer surface of said liner sheet portion at least during part of the time that said portions are at said bonding temperature to thereby bond the same, and thereafter quenching said bonded portions to minimize warping and to improve the metallurgical properties of said liner sheet.

4. A method of manufacturing a composite metal article, which comprises placing a first metal member in flatwise engagement with a second metal member, induction heating the interfaces of opposed portions of said members to a bonding temperature, said portions being of substantial diameter both in length and in width, and applying a high fluid pressure to the outer surface of at least one of said opposed portions while resisting movement of the other of said opposed portions in the direction of pressure application to thereby force said heated interfaces into continuous pressure contact and effect a strong and permanent bond therebetween.

5. A method of manufacturing a composite metal plate, which comprises placing a metal liner sheet and a metal base plate in contiguous flatwise relation, applying fluid under pressure to the outer surface of a substantial portion of said liner sheet for bending thereof into continuous conformity with the contours of the corresponding base plate portion, and inducing a fluctuating current into said liner sheet and base plate portions to heat the same to a bonding temperature, the pressure of said fluid being sufficient during at least part of the interval when said portions are at bonding temperature to effect a strong and permanent bond therebetween.

6. A method of manufacturing a composite metal plate, which comprises placing a relatively thin metal liner sheet in flatwise engagement with a metal base plate, inducing alternating currents into a substantial portion of said liner sheet and into the opposed portion of said base plate for a period of time sufficient to heat the interfaces of said portions to a bonding temperature, applying a fluid under high pressure to the outer surface of said liner sheet portion while preventing substantial movement of said opposed base plate portion to thereby effect continuous pressure contact between said heated interfaces and bond the same, said fluid being stable relative to the liner metal at said bonding temperature, and then quenching said liner sheet portion to impart the desired metallurgical properties thereto and to minimize the effects of warping thereof.

7. In a method of bonding a metal base plate and a relatively thin metal liner sheet disposed in generally flatwise engagement therewith, the steps of applying fluid pressure to the outer surface of a substantial portion of said liner sheet while resisting movement of the corresponding base plate portion in the direction of pressure application, and induction heating said base plate and liner sheet portions to a bonding temperature while maintaining said fluid pressure, the amount of said fluid pressure being at least sufficient prior to the main portion of the induction heating step to bend said liner sheet portion into continuous engagement with said base plate portion and being sufficient after said bonding temperature is attained to effect a bond between said portions.

8. A method of manufacturing a composite metal plate, which comprises placing a metal liner sheet and a metal base plate in contiguous flatwise relation, applying fluid under high pressure to the outer surface of a substantial portion of said liner sheet, inducing alternating currents into said liner sheet portion and into the corresponding base plate portion at approximately the same time as the application of said fluid under pressure, and maintaining said induced alternating currents until said liner and base plate portions reach a bonding temperature, said fluid under pressure operating upon heating of said liner sheet portion to a relatively pliable state to bend the same into continuous conformity with said base plate portion and upon subsequent uniform heating of said liner and base plate portions to said bonding temperature to create a strong and permanent bond therebetween.

9. A method of manufacturing a composite plate, which comprises arranging a metal base plate and a relatively thin metal liner sheet in contiguous flatwise relation, applying fluid under pressure to at least a portion of the outer surface of said liner sheet while holding the corresponding base plate portion against movement in the direction of pressure application, said liner sheet portion being of substantial diameter in both length and width and said fluid being stable relative to said liner sheet portion at the temperature to which the same is subjected during bonding, and induction heating said liner and base plate portions to a welding temperature while maintaining said fluid under pressure and continuing the holding of said base plate portion, the amount of said pressure being at least sufficient prior to the main portion of said induction heating operation to bend said liner sheet portion into continuous conformity with the contours of said base plate portion and sufficient after said welding temperature is attained to effect a strong and permanent weld between said portions.

10. A method of manufacturing a composite plate, which comprises disposing a metal liner sheet in flatwise engagement with a relatively thick metal base plate, defining a chamber adjacent at least a substantial portion of said liner sheet, induction heating said liner sheet portion to a bonding temperature, and applying fluid under high pressure within said chamber to increase the size thereof and thereby force said liner sheet portion into continuous pressure contact with the corresponding base plate portion to effect uniform bonding of the liner sheet to the base plate.

11. A method of manufacturing a composite plate, which comprises arranging a metal base plate and a relatively thin metal liner sheet in contiguous flatwise relation, disposing an inducing coil adjacent at least a substantial portion of the outer surface of said liner sheet, defining a fluid-tight chamber around said inducing coil, one wall of the chamber being formed by said liner sheet portion, injecting fluid under high pressure into said chamber for forcing of said liner sheet portion into continuous conformity with the corresponding base plate portion, substantially simultaneously applying an alternating current to said coil to induce corresponding currents into said liner and base plate portions, and maintaining said current for a period of time sufficient to induction heat the interfaces of said portions to a bonding temperature, said pressure being at least continued during heating for bonding of said portions when bonding temperature is reached.

12. A method of manufacturing a composite plate, which comprises disposing a metal liner sheet in contiguous flatwise relation with a metal base plate, defining a chamber adjacent a portion of the outer liner sheet surface, said chamber being of substantial diameter both longitudinally and transversely of said portion and having one wall formed by said portion, and applying fluid under high pressure within said chamber and induction heating said portion and the corresponding base plate portion to bonding temperature, said fluid being stable relative to the metal of said liner sheet portion and serving to force the same into continuous conformity with the corresponding base plate portion to thereby effect a strong and permanent bond therebetween.

13. A method of manufacturing a composite article, which comprises placing two sheet members in contiguous flatwise relation, induction heating two opposed portions of said members to a bonding temperature and applying high fluid pressure to at least one of said portions to force the same into continuous pressure conformity with the opposed portion to thus effect a bond therebetween, and thereafter repeating said operations on adjacent portions of said members until the members are bonded throughout the entire extent thereof.

14. Apparatus for binding a corrosion resistant liner sheet to a corrodible base plate disposed in flatwise engagement therewith, comprising a casing shaped to be positioned on a portion of said liner sheet and to form a substantially fluid-tight chamber, an inducing coil mounted within said casing to induce heating currents into said liner sheet portion and into the corresponding portion of said base plate, means to inject pressure fluid into said chamber to force said liner sheet and base plate portions into continuous pressure contact, and means to hold casing against the liner sheet during the pressure operation.

15. Apparatus for bonding a corrosion resistant liner sheet to a corrodible base plate disposed in flatwise engagement therewith, comprising an open-bottomed metal casing adapted to be positioned on the liner sheet, a non-conducting and substantially incompressible filler member disposed in the closed portion of said casing, an inducing coil mounted adjacent said filler member near the open bottom of said casing to induce heating currents into the liner sheet and base plate, means mounted adjacent the open bottom of said casing to seal the same against the liner sheet and form a fluid-tight chamber between said filler member and the liner sheet, a port in said casing adapted to admit pressure fluid into said chamber and thus force the liner sheet and base plate into uniform contact, and means to hold said casing against the liner sheet and to prevent substantial movement of the base plate in the direction of pressure application.

ORRIN E. ANDRUS.

References Cited in the file of this patent

UNITED STATES PATENTS

| Number | Name | Date |
|---|---|---|
| 1,453,358 | Kettering | May 1, 1923 |
| 1,710,258 | Hume | Apr. 23, 1929 |
| 2,280,689 | Denneen | Apr. 21, 1942 |
| 2,478,037 | Brennan | Aug. 2, 1949 |